US010977530B2

(12) United States Patent
Mao et al.

(10) Patent No.: US 10,977,530 B2
(45) Date of Patent: Apr. 13, 2021

(54) THUNDERNET: A TURBO UNIFIED NETWORK FOR REAL-TIME SEMANTIC SEGMENTATION

(71) Applicants: Beijing Jingdong Shangke Information Technology Co., Ltd., Beijing (CN); JD.com American Technologies Corporation, Mountain View, CA (US)

(72) Inventors: Hongda Mao, Fremont, CA (US); Wei Xiang, Mountain View, CA (US)

(73) Assignees: Beijing Jingdong Shangke Information Technology Co., Ltd., Beijing (CN); JD.com American Technologies Corporation, Mountain View, CA (US)

(*) Notice: Subject to any disclaimer, the term of this patent is extended or adjusted under 35 U.S.C. 154(b) by 185 days.

(21) Appl. No.: 16/238,818

(22) Filed: Jan. 3, 2019

(65) Prior Publication Data
US 2020/0218948 A1 Jul. 9, 2020

(51) Int. Cl.
G06K 9/72 (2006.01)
G06K 9/62 (2006.01)
G06T 9/00 (2006.01)
G06K 9/36 (2006.01)

(52) U.S. Cl.
CPC ........... G06K 9/726 (2013.01); G06K 9/6232 (2013.01); G06T 9/002 (2013.01); G06K 9/6268 (2013.01); G06K 2009/366 (2013.01); G06T 2207/20081 (2013.01); G06T 2207/20084 (2013.01); G06T 2207/30236 (2013.01)

(58) Field of Classification Search
CPC .............. G06K 9/4628; G06K 9/00791; G06T 2207/20084
See application file for complete search history.

(56) References Cited

PUBLICATIONS

Badrinarayanan, A. Kendall, and R. Cipolla. Segnet: A deep convolutional encoder-decoder architecture for image segmentation. IEEE transactions on pattern analysis and machine intelligence, 2017, 39(12):2481-2495. (Year: 2017).*
Chen, G. Papandreou, F. Schroff, and H. Adam. Rethinking atrous convolution for semantic image segmentation. arXiv preprint arXiv:1706.05587,2017. (Year: 2017).*
He, X. Zhang, S. Ren, and J. Sun. Deep residual learning for image recognition. In Proceedings of the IEEE inference on computer vision and pattern recognition, 2016, 770-778. (Year: 2016).*
(Continued)

Primary Examiner — Ross Varndell
(74) Attorney, Agent, or Firm — China Science Patent & Trademark US LLC; Shanyun Lu

(57) ABSTRACT

System and method for semantic segmentation. The system includes a computing device. The computing device has a processor and a non-volatile memory storing computer executable code. The computer executable code, when executed at the processor, is configured to: receive an image of a scene; process the image by an encoder to form an encoder feature map; process the encoder feature map by a pyramid pooling module (PPM) to form an PPM feature map; and process the PPM feature map by a decoder to form a segmentation feature map.

16 Claims, 12 Drawing Sheets

(56) References Cited

PUBLICATIONS

V. Badrinarayanan, A. Kendall, and R. Cipolla. Segnet: A deep convolutional encoder-decoder architecture for image segmentation. IEEE transactions on pattern analysis and machine intelligence, 2017, 39(12):2481-2495.
L.-C. Chen, G. Papandreou, I. Kokkinos, K. Murphy, and A. L. Yuille. Semantic image segmentation with deep convolutional nets and fully connected crfs. In ICLR, 2015.
L.-C. Chen, G. Papandreou, I. Kokkinos, K. Murphy, and A. L. Yuille. Deeplab: Semantic image segmentation with deep convolutional nets, atrous convolution, and fully connected crfs. arXiv preprint arXiv:1606.00915, 2016.
L.-C. Chen, G. Papandreou, F. Schroff, and H. Adam. Rethinking atrous convolution for semantic image segmentation. arXiv preprint arXiv:1706.05587, 2017.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
F. Chollet. Xception: Deep learning with depthwise separable convolutions. arXiv preprint, 2016.
M. Cordts, M. Omran, S. Ramos, T. Rehfeld, M. Enzweiler, R. Benenson, U. Franke, S. Roth, and B. Schiele. The cityscapes dataset for semantic urban scene understanding. In Proceedings of the IEEE conference on computer vision and pattern recognition, 2016, 3213-3223.
K. He, X. Zhang, S. Ren, and J. Sun. Deep residual learning for image recognition. In Proceedings of the IEEE conference on computer vision and pattern recognition, 2016, 770-778.
K.-H. Kim, S. Hong, B. Roh, Y. Cheon, and M. Park. Pvanet: deep but lightweight neural networks for real-time object detection. arXiv preprint arXiv:1608.08021, 2016.
D. P. Kingma and J. Ba. Adam: A method for stochastic optimization. arXiv preprint arXiv:1412.6980, 2014.
A. Krizhevsky, I. Sutskever, and G. E Hinton. Imagenet classification with deep convolutional neural networks. In Advances in neural information processing systems, 2012, 1097-1105.
L.-J. Li, R. Socher, and L. Fei-Fei. Towards total scene understanding: Classification, annotation and segmentation in an automatic framework. In IEEE Conference on Computer Vision and Pattern Recognition (CVPR), 2009, 2036-2043.
G. Lin, A. Milan, C. Shen, and I. Reid. Refinenet: Multi-path refinement networks for high-resolution semantic segmentation. In IEEE Conference on Computer Vision and Pattern Recognition (CVPR), 2017.
G. Lin, C. Shen, A. Van Den Hengel, and I. Reid. Efficient piecewise training of deep structured models for semantic segmentation. In Proceedings of the IEEE Conference on Computer Vision and Pattern Recognition, 2016, 3194-3203.
T.-Y. Lin, P. Doll'ar, R. Girshick, K. He, B. Hariharan, and S. Belongie. Feature pyramid networks for object detection. In CVPR, 2017, vol. 1, p. 4.
J. Long, E. Shelhamer, and T. Darrell. Fully convolutional networks for semantic segmentation. In Proceedings of the IEEE conference on computer vision and pattern recognition, 2015, 3431-3440.
A. Mallya and S. Lazebnik. Learning models for actions and person-object interactions with transfer to question answering. In European Conference on Computer Vision, 2016, 414-428.
H. Noh, S. Hong, and B. Han. Learning deconvolution network for semantic segmentation. In Proceedings of the IEEE International Conference on Computer Vision, 2015, 1520-1528.
A. Paszke, A. Chaurasia, S. Kim, and E. Culurciello. Enet: A deep neural network architecture for real-time semantic segmentation. arXiv preprint arXiv:1606.02147, 2016.
C. Peng, X. Zhang, G. Yu, G. Luo, and J. Sun. Large kernel matters—improve semantic segmentation by global convolutional network. arXiv preprint arXiv:1703.02719, 2017.
E. Romera, J. M. Alvarez, L. M. Bergasa, and R. Arroyo. Erfnet: Efficient residual factorized convnet for real-time semantic segmentation. IEEE Transactions on Intelligent Transportation Systems, 2018, 19(1):263-272.
O. Ronneberger, P. Fischer, and T. Brox. U-net: Convolutional networks for biomedical image segmentation. In International Conference on Medical image computing and computer-assisted intervention, 2015, 234-241.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. International Journal of Computer Vision, 2015, 115(3):211-252.
K. Simonyan and A. Zisserman. Very deep convolutional networks for large-scale image recognition. arXiv preprint arXiv:1409.1556, 2014.
R. Socher, C. C. Lin, C. Manning, and A. Y. Ng. Parsing natural scenes and natural language with recursive neural networks. In Proceedings of the 28th international conference on machine learning (ICML-11), 2011, 129-136.
M. Treml, J. Arjona-Medina, T. Unterthiner, R. Durgesh, F. Friedmann, P. Schuberth, A. Mayr, M. Heusel, M. Hofmarcher, M. Widrich, et al. Speeding up semantic segmentation for autonomous driving. In MLITS, NIPS Workshop, 2016.
P. Wang, P. Chen, Y. Yuan, D. Liu, Z. Huang, X. Hou, and G. Cottrell. Understanding convolution for semantic segmentation. arXiv preprint arXiv:1702.08502, 2017.
F. Yu and V. Koltun. Multi-scale context aggregation by dilated convolutions. arXiv preprint arXiv:1511.07122, 2015.
H. Zhao, X. Qi, X. Shen, J. Shi, and J. Jia. Icnet for real-time semantic segmentation on high-resolution images. arXiv preprint arXiv:1704.08545, 2017.
H. Zhao, J. Shi, X. Qi, X. Wang, and J. Jia. Pyramid scene parsing network. In IEEE Conf. on Computer Vision and Pattern Recognition (CVPR), 2017, 2881-2890.
S. Zheng, S. Jayasumana, B. Romera-Paredes, V. Vineet, Z. Su, D. Du, C. Huang, and P. H. Torr. Conditional random fields as recurrent neural networks. In Proceedings of the IEEE International Conference on Computer Vision, 2015, 1529-1537.

\* cited by examiner

Table 1

| Model | NVIDIA TEGRA TX1 (Jetson) | | | | | | NVIDIA Titan X | | | | | |
|---|---|---|---|---|---|---|---|---|---|---|---|---|
| | 480x320 | | 640x360 | | 1280x720 | | 480x320 | | 640x360 | | 1280x720 | |
| | ms | fps | ms | fps | ms | fps | ms | fps | ms | fps | ms | fps |
| SegNet [1] | 757 | 1.3 | 1251 | 0.8 | - | - | 69 | 14.6 | 289 | 3.5 | 637 | 1.6 |
| ENet [19] | 47 | 21.1 | 69 | 14.6 | 262 | 3.8 | 7 | 135.4 | 21 | 46.8 | 46 | 21.6 |
| SQ [26] | 60 | 16.7 | 86 | 11.6 | 389 | 2.6 | N/A | | | | | |
| ERFNet [21] | 93 | 10.8 | 141 | 7.1 | 535 | 1.9 | 12 | 83.3 | 41 | 24.4 | 88 | 11.4 |
| | NVIDIA TEGRA TX2 (Jetson) | | | | | | NVIDIA Titan XP | | | | | |
| ENet* [19] | 62.9 | 15.9 | 87.4 | 11.4 | 298.6 | 3.3 | 8.2 | 122 | 9.5 | 105.3 | 23.1 | 43.3 |
| ThunderNet | 56.8 | 17.6 | 82.9 | 12.1 | 304 | 3.3 | 4.8 | 208 | 6 | 166.7 | 15.7 | 63.7 |

FIG. 6A

Table 2

| Method | Sub | mIoU (%) | Time (ms) | Frame (fps) |
|---|---|---|---|---|
| SegNet [1] | 4 | 57.0 | 60 | 1.7 |
| PSPNet [30] | 2 | 78.4 | 358 | 2.8 |
| CRF-RNN [31] | 2 | 62.5 | 700 | 1.4 |
| DeepLabv2 [3] | 2 | 63.1 | 400 | 2.5 |
| FCN-8S [16] | no | 65.3 | 500 | 2 |
| Adelaide [14] | no | 66.4 | 35000 | 0.03 |
| Dilation10 [28] | no | 67.1 | 4000 | 0.25 |
| SQ [26] | no | 59.8 | 60 | 16.7 |
| ICNet [29] | no | 69.5 | 33 | 30.3 |
| Enet [19] | 2 | 58.3 | 13 | 76.9 |
| ERFNet [21] | 2 | 69.7 | 24 | 41.7 |
| ThunderNet | 2 | 64.0 | 10.4 | 96.2 |

FIG. 6B

Table 3

| Model | NVIDIA TEGRA TX1 (Jetson) | | | | | | NVIDIA Titan X | | | | | |
|---|---|---|---|---|---|---|---|---|---|---|---|---|
| | 512x256 | | 1024x512 | | 2048x1024 | | 512x256 | | 1024x512 | | 2048x1024 | |
| | ms | fps | ms | fps | ms | fps | ms | fps | ms | fps | ms | fps |
| ENet [19] | 41 | 24.4 | 145 | 6.9 | 660 | 1.5 | 7 | 142.9 | 13 | 76.9 | 49 | 20.4 |
| ERFNet [21] | 85 | 11.8 | 310 | 3.2 | 1240 | 0.8 | 8 | 125 | 24 | 41.7 | 89 | 11.2 |
| | NVIDIA TEGRA TX2 (Jetson) | | | | | | NVIDIA Titan XP | | | | | |
| ICNet [29] | 327.2 | | | | 3.1 | | 45.5 | | | | 25.3 | |
| ENet* [19] | 56.3 | 17.8 | 175.3 | 5.7 | 891.9 | 1.1 | 8 | 125 | 15.3 | 65.3 | 46.8 | 21.4 |
| ThunderNet | 47.9 | 20.9 | 171 | 5.8 | 682.7 | 1.5 | 4.7 | 212.8 | 10.4 | 96.2 | 30.2 | 33.1 |

FIG. 6C

Table 4

| Backbone | Input Size | | | Input Size | | | Input Size | | |
|---|---|---|---|---|---|---|---|---|---|
| | 384x384 | | | 512x512 | | | 783x783 | | |
| | FPS | Pixel Acc % | mIoU % (val) | FPS | Pixel Acc % | mIoU % (val) | FPS | Pixel Acc % | mIoU % (val) |
| ResNet18-3b | 147.5 | 74.3 | 43.39 | 94 | 76.8 | 46.48 | 50.8 | 78.59 | 48.01 |
| ResNet18-4b | 104.5 | 74.94 | 45.33 | 71.5 | 76.37 | 46.73 | 39 | 78.82 | 48.16 |

FIG. 6D

Table 5

| Model | ResNet18-3b | ResNet18-3b +PPM | ResNet18-3b +decoder | ResNet18-3b +PPM+decoder |
|---|---|---|---|---|
| mIoU % | 60.02 | 61.18 | 62.31 | 64.77 |

FIG. 6E

THUNDERNET: A TURBO UNIFIED NETWORK FOR REAL-TIME SEMANTIC SEGMENTATION

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to computer vision, and more particularly to systems and methods for real-time semantic segmentation using ThunderNet containing a truncated encoder, a pyramid pooling module (PPM) and a customized decoder.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Image semantic segmentation is a fundamental problem in computer vision. Its main task is to perform dense predictions over all pixels and output categories belonging to each. Semantic segmentation has been in the long run treated as a crucial part in achieving deep understandings of the image, with topics include, but not limited to instance segmentation, scene parsing, and human object interactions etc. [12, 17, 25]. In the past years, deep learning approaches [1, 3, 14, 16, 18, 28] have made fruitful progress in semantic segmentation, with the development of Convolutional Neural Networks (CNNs) and many emerging technologies related to it.

However, recent advances in semantic segmentation with CNNs largely depend on those deep and wild backbones, with dedicated designs of various bottlenecks and many other meta-architectures. Taking those sophisticated designs results in a large amount of redundant overhead, regarding to the number of operations in order to make dense predictions. In FIG. 6F, we show the accuracy of state-of-the-art methods on Cityscapes dataset [7], in addition to their runtime speed. By increasing network complexity, most research [1, 3, 4, 14, 16, 18, 28, 30] in the past few year has focused on generating high-quality predictions, and thus inevitably slower the inference speed to a great extent. Several works in the literature have been proposed to overcome the speed issue, including SQ [26], ENet [19], ICNet [29] and the most recent ERFNet [21]. They aim at improving the inference speed while attempting to maintain comparable accuracy. Nonetheless, as shown in FIG. 6F, few of these methods have achieved real-time speed with satisfactory performance (i.e. around or above 65% mIoU on Cityscapes). Under such circumstances, real-time semantic segmentation on embedded systems (mobile platforms, NVIDIA Jetson TX1/TX2, etc.) has become a fundamentally crucial, but very challenging task.

Therefore, an unaddressed need exists in the art to address the aforementioned deficiencies and inadequacies.

SUMMARY OF THE INVENTION

In certain aspects, the present invention relates to a system for semantic segmentation. In certain embodiments, the system includes a computing device, and the computing device has a processor and a non-volatile memory storing computer executable code. The computer executable code, when executed at the processor, is configured to: receive an image of a scene; process the image by an encoder to form an encoder feature map; process the encoder feature map by a pyramid pooling module (PPM) to form an PPM feature map; and process the PPM feature map by a decoder to form a segmentation feature map.

In certain embodiments, the encoder includes a ResNet18 backbone truncated away from its $4^{th}$ block. In certain embodiments, the encoder consists of sequentially: a root having two units, a first block, a second block, and a third block. Each of the blocks has a first, a second, a third, and a fourth repeating units, the first unit is convoluted and added to output of the second unit, the third unit is convoluted and added to output of the fourth unit, and each unit in the root and the blocks consists of a 3×3 convolution layer, a batch normalization (BN) layer, and a rectified linear unit (ReLU). In certain embodiments, height, width, and channel dimensions of the two layers of the root, the first block, the second block and the third block are respectively 256×512×64, 128×256×64, 128×256×64, 64×128×128, and 32×64×256.

In certain embodiments, the PPM includes: pyramid pooled features at different sizes; a bilinear upsample layer; a 1×1 convolution layer; and a ReLU layer. In certain embodiments, the pyramid pooled features comprises 1×1×512 feature, 2×2×512 feature, 3×3×256 feature, and 6×6×256 feature. In certain embodiments, the bilinear upsample layer has a dimension of 32×64×1536, and each of the 1×1 convolution layer and the ReLU layer has a dimension of 32×64×256.

In certain embodiments, the decoder includes sequentially: a first level deconvolution unsample block, a second level deconvolution upsample block, and a bilinear upsample block. In certain embodiments, the first level deconvolution unsample block includes a first convolution layer, a first deconvolution upsample layer, a first BN layer, a second convolution layer, a second BN layer and a first ReLU layer; the second level deconvolution upsample block includes a third convolution layer, a second deconvolution upsample layer, a third BN layer, a fourth convolution layer, a fourth BN layer, and a second ReLU layer; the bilinear upsample block includes a bilinear upsample layer and a fifth convolution layer; and the first convolution layer is convoluted and added to the second BN layer, and the third convolution layer is convoluted and added to the fourth BN layer. In certain embodiments, the first deconvolution layer has a dimension of 32×64×256; the first deconvolution upsample layer and the first BN layer have dimensions of 64×128×256; the second convolution layer, the second BN layer, the first ReLU layer, and the third convolution layer have dimensions of 64×128×128; the second deconvolution upsample layer and the third BN layer have dimensions of 128×256×128; the fourth convolution layer, the fourth BN layer, and the second ReLU layer have dimensions of 128×256×64; the bilinear upsample layer has a dimension of 512×1024×64; and the fifth convolution layer has a dimension of 512×1024×20. In certain embodiments, the first convolution layer is convoluted and added to the second BN layer, and the third convolution layer is convoluted and added to the fourth BN layer.

In certain embodiments, the computer executable code is further configured to control an operating device in the scene based on the segmentation map. In certain embodiments, the operating device is an autonomous driving vehicle.

In certain aspects, the present invention relates to a method for semantic segmentation. In certain embodiments, the method includes: receiving, by a computing device, an image of a scene; processing, by the computing device, the image to form an encoder feature map; processing, by the computing device, the encoder feature map to form a pyramid pooling module (PPM) feature map; and processing, by the computing device, the PPM feature map to form a segmentation feature map.

In certain embodiments, the step of processing the image to form an encoder feature map is performed by an encoder, and the encoder includes a ResNet 18 backbone truncated away from its $4^{th}$ block.

In certain embodiments, the step of processing the encoder feature map to form the PPM feature map is performed by a PPM, and the PPM includes: pyramid pooled features at different sizes; a bilinear upsample layer; a 1×1 convolution layer; and a ReLU layer.

In certain embodiments, the step of processing the PPM feature map to form a segmentation feature map is performed by a decoder, and the decoder includes a first level deconvolution unsample block, a second level deconvolution upsample block, and a bilinear upsample block. In certain embodiments, the first level deconvolution unsample block includes a first convolution layer, a first deconvolution upsample layer, a first BN layer, a second convolution layer, a second BN layer, and a first ReLU layer; the second level deconvolution upsample block includes a third convolution layer, a second deconvolution upsample layer, a third BN layer, a fourth convolution layer, a fourth BN layer, and a second ReLU layer; and the bilinear upsample block includes a bilinear upsample layer and a fifth convolution layer. In certain embodiments, the first convolution layer is convoluted and added to the second BN layer, and the third convolution layer is convoluted and added to the fourth BN layer.

In certain embodiments, the method further includes: controlling an operating device in the scene based on the segmentation map.

In certain aspects, the present invention relates to a non-transitory computer readable medium storing computer executable code. The computer executable code, when executed at a processor of a computing device, is configured to perform the methods described above.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein:

FIG. 6A schematically shows Table 1 according to certain embodiments of the present disclosure, where inference speed by fastest models currently available are compared.

FIG. 6B schematically shows Table 2 according to certain embodiments of the present disclosure, where final accuracy and speed on Cityscapes test set by different models are compared.

FIG. 6C schematically shows Table 3 according to certain embodiments of the present disclosure, where inference speed at different input sizes by different models are compared.

FIG. 6D schematically shows Table 4 according to certain embodiments of the present disclosure, where experiment results at different input sizes on Cityscapes validation set by different models are compared.

FIG. 6E schematically shows Table 5 according to certain embodiments of the present disclosure, where ablation study for adding PPM and decoder on Cityscapes validation set are compared.

DETAILED DESCRIPTION OF THE INVENTION

Figure 1:
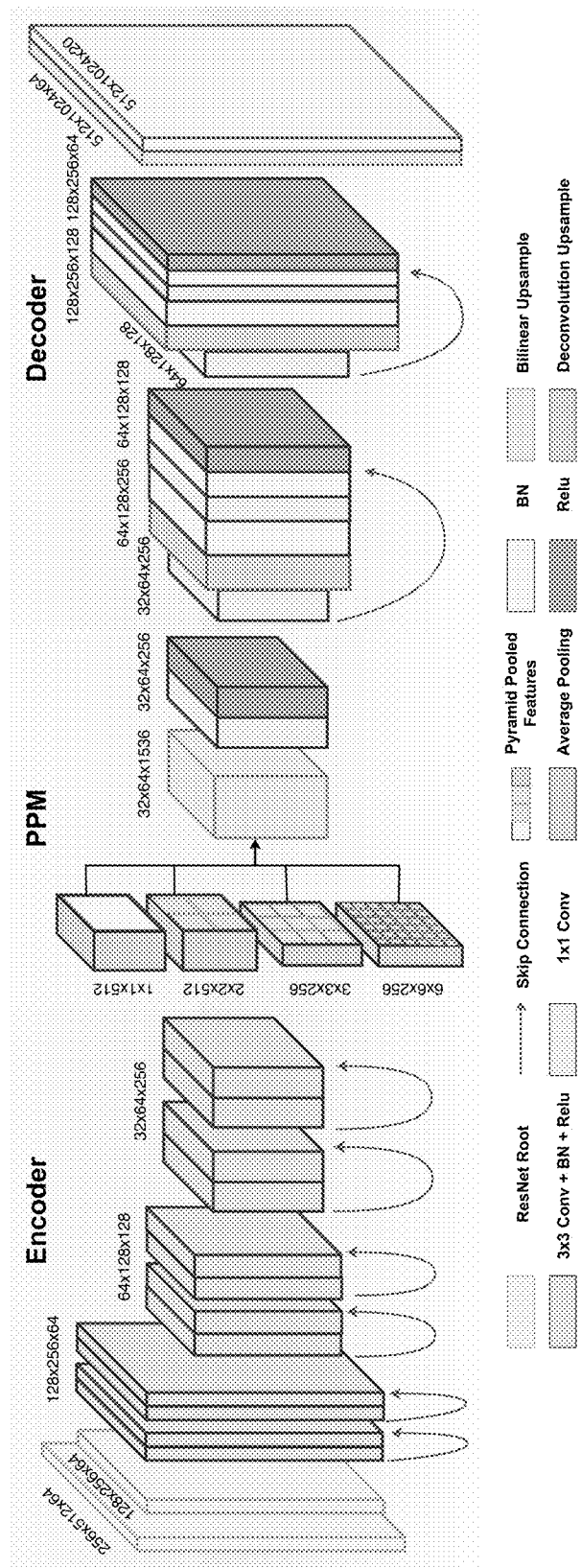
FIG. 1 schematically depicts a ThunderNet structure according to certain embodiments of the present disclosure.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "plurality" means two or more. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

As described above, it is a challenge to have real-time semantic segmentation with limited computing resources. In certain aspects, the present disclosure provides a fast and efficient lightweight network that achieves 64% mIoU on Cityscapes with 96.2 frames per second (fps), which greatly boosts the previous methods regarding to the trade-off between accuracy and runtime speed. In certain embodiments, the method is termed Turbo Unified Network (ThunderNet), unifies both pyramid pooling module [30] and decoder structure, and builds upon a minimum backbone truncated from ResNet18 [8]. Certain embodiments of the present disclosure, among other things, have the following beneficial advantages:

(1) The novel and extremely lightweight network (ThunderNet) achieves high accuracy of 64% mIoU on Cityscapes1 with single-scale test, in addition to significantly faster inference speed (96.2 fps on Titan XP, input size 512×1024).

(2) Comparing to those real-time methods currently available in the literature, ThunderNet does not utilize any bottleneck modules and thus enables easy and flexible combinations with many popular meta-architectures and designs. In certain embodiments, by incorporating those meta-architectures directly, the disclosure further improves the model but with runtime speed penalized to a certain extent, depending on the preferences and choices.

(3) ThunderNet follows the encoder-decoder architecture [1] which allows for training in an end-to-end fashion. Without bells and whistles (those non-trivial training techniques, for example transfer learning, alternative training and auxiliary loss), ThunderNet can be trained in a simple setting and converges in only hours.

(4) The ThunderNet is tested on NVIDIA Jetson TX2, which achieves 20.9 fps (input size 256×512) with large speedup of inference time on embedded systems—up to 1.2× over ENet [19] and 1.8× over ERFNet [21] respectively.

In accordance with the purposes of the present disclosure, as embodied and broadly described herein, in certain aspects, the present disclosure relates to a system for real-time semantic segmentation. FIG. 1 schematically depicts a framework of ThunderNet according to certain embodiments of the present disclosure for real-time semantic segmentation. In certain embodiments, as shown in FIG. 1, ThunderNet mainly consists of an encoder, a pyramid pooling module and a customized decoder. The encoder uses a ResNet18 [8] network that has been truncated away from its 4th block. For pyramid pooling module, the setting is the same as that of PSPNet [30], but the bottleneck convolution layer (the one after bilinear upsampling) is further reduced to 1×1 convolution with 256 channels (instead of 3×3 convolution with 512 channels in [30]). For decoder, a customized decoder consists of two consecutive deconvolution upsampling that both appends to and followed by a 1×1 convolution layer.

ThunderNet is simply, but yet very efficient for the task of image semantic segmentation. Firstly, in order to have a network with fast inference speed, the lightweight encoder is consisting of fewer convolution layers, using skip-connection and with smaller number of output channels compared to those networks similar to the VGG16 implementation [24]. According to an online study [https://towardsdatascience.com/neural-network-architectures-156e5bad51ba], ResNet18 is one of those very efficient backbones regarding to the number of operations it takes versus its performance on ImageNet. As shown in Table 4 (FIG. 6D), by comparing the performance of the truncated ResNet18 (ResNet18-3b) of the present disclosure to the original ResNet18 (ResNet18-4b), the three block structure of the present disclosure is advantageous over the original ResNet18, especially in regard to image processing speed when the images have reasonably higher resolution.

Secondly, as shown in Tale 5 (FIG. 6E), the incorporation of PPM not only helps to visually enhance the smoothness of object geometries, but also boosts quantitative segmentation results. By appending a FPN-alike decoder, the boundary details can be learned more and thus improving the segmentation results further.

Thirdly, all convolution layers used in ThunderNet contain merely standard convolution operations, either 1×1 or 3×3. This easy realization of the network enables fast prototyping, as well as flexible combinations with other meta-architectures and designs.

Last but not least, due to the fully-optimized matrix adds/multiplications with standard convolutions under a Desktop-level GPU like Titan X/XP, ThunderNet's dedicated design of using merely standard convolution layers benefits significantly more than those networks using bottleneck modules (for example ENet [19] and ERFNet [21]). Such advantage of ThunderNet makes it an extremely fast network. With Titan XP, the inference speedup can be up to ×2 compared to the currently fastest network ENet [19].

Figure 2:
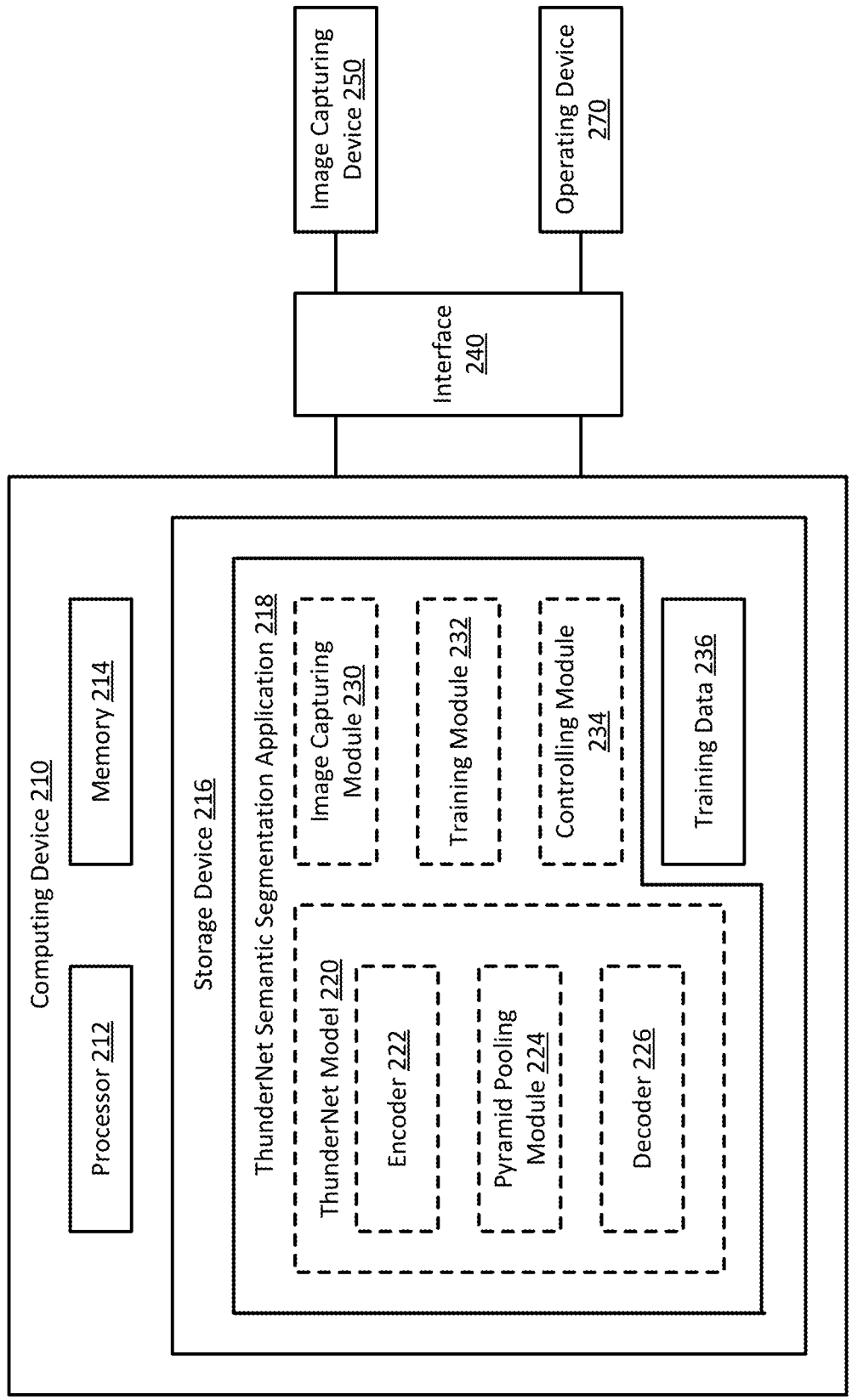
FIG. 2 schematically depicts a system for semantic segmentation according to certain embodiments of the present disclosure.

FIG. 2 schematically shows a system for real-time semantic segmentation according to certain embodiments of the present disclosure. As shown in FIG. 2, the system includes a computing device 210, an image capturing device 250, and an operating device 270. The image capturing device 250 and the operating device 270 are in communication with the computing device 210 via, for example, a same or different system interfaces or networks 240.

In certain embodiments, the computing device 210 may be a general-purpose computer, a specialized computer, a smart phone, a tablet, a controller, a cluster, or a cloud based device. The computing device 210 provides real-time semantic segmentation service.

In certain embodiments, the system interface 240 may be various buses, storage devices, other I/O devices, or a USB interface. When the interface is a network, the network 240 may be a wired or wireless network, and may be of various forms. Examples of the networks may include, but is not limited to, a local area network (LAN), a wide area network (WAN) including the Internet, or any other type of networks. In certain embodiments, the system interface 240 may be any other types of interfaces to communicatively connect the computing device 210 and the image capturing device 250 and the operating device 270.

In certain embodiments, the image capturing device 250 may be a video camera, a gray scale camera, an RGB camera, an RGB depth camera, a depth camera, a LIDAR, or a combination thereof. The image capturing device 250 is configured to capture an image of an environment or a scene, and preferably to capture images continuously in a format of a video.

In certain embodiments, the operating device 270 may be an autonomous driving vehicle, a medical imaging device, an industrial inspection machine, or any other devices that requires instruction based on semantic segmentation information. When the computing device 210 receives images or videos from the image capturing device 240, performs real-time semantic segmentation, the computing device 210 may use the obtained real-time semantic segmentation to instruct the operation of the operating device 270. In certain embodiments, the operating device 270 may be controlled by a controller other than the computing device 210, and the controller is configured to receive the semantic segmentation information from the computing device 210, and uses the information to instruct the operating device 270 to work.

In certain embodiments, as shown in FIG. 2, the computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In some embodiments, the server computing device 210 may have more than one CPU as the processor, such as two CPUs, four CPUs, eight CPUs, or any suitable number of CPUs.

The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214.

The storage device 216 is a non-volatile data storage media for storing the OS (not shown) and other applications of the inventory allocation computing device 210. Examples of the storage device 216 may include non-volatile memory such as flash memory, memory cards, USB drives, hard drives, floppy disks, optical drives, or any other types of data storage devices. In certain embodiments, the computing device 210 may have multiple storage devices 216, which may be identical storage devices or different types of storage devices, and the applications of the computing device 210 may be stored in one or more of the storage devices 216 of the computing device 210.

The storage device 216 includes a ThunderNet semantic segmentation application 218 and a training data 236. The ThunderNet semantic segmentation application 218 is configured to process captured images to obtain segmentation map that have all the pixels labeled with their respective categories. The training data 236 is used by the ThunderNet semantic segmentation application 218 to train the ThunderNet model. In certain embodiments, the ThunderNet model of the ThunderNet semantic segmentation application may be trained in advance before being installed in the storage device 216, and the storage device 216 doesn't need to have the training data 236. In certain embodiments, the storage device 216 may include other modules necessary for training and performing the semantic segmentation.

As shown in FIG. 2, the ThunderNet semantic segmentation application 218 includes a ThunderNet model 220, an image capturing module 230, and optionally a training module 232 and a controlling module 234. The ThunderNet model 220 includes an encoder 222, a pyramid pooling module (PPM) 224, and a decoder 226. In certain embodiments, the ThunderNet semantic segmentation application 218 is performed at real time, and the segmentation map or feature map is used at real time for controlling the operating device 270. In certain embodiments, the ThunderNet semantic segmentation application 218 may not include one or more of the image capturing module 220, the training module 232, and the controlling module 228, but at least includes the ThunderNet model 220, where the ThunderNet model 220 is configured to receive images, performing semantic segmentation of the received images, and output segmentation map or feature map.

The image capturing module 230 is configured to instruct the image capturing device 250 to capture images or videos of the scene or environment at real-time. In certain embodiments, the image capture module 230 may also passively receive images captured by the image capturing device 250. After obtaining the images, the image capture module 230 may further pre-process the images. The pre-process may include, among other things, synchronizing the images from different resources such as multiple cameras of the image capturing device 250, adjusting light balance of the images, reformatting the images, and resizing the images. The image capture module 230 then sends the processed images to the ThunderNet model 220, specifically the encoder 222 of the ThunderNet model 220.

Figure 3A:
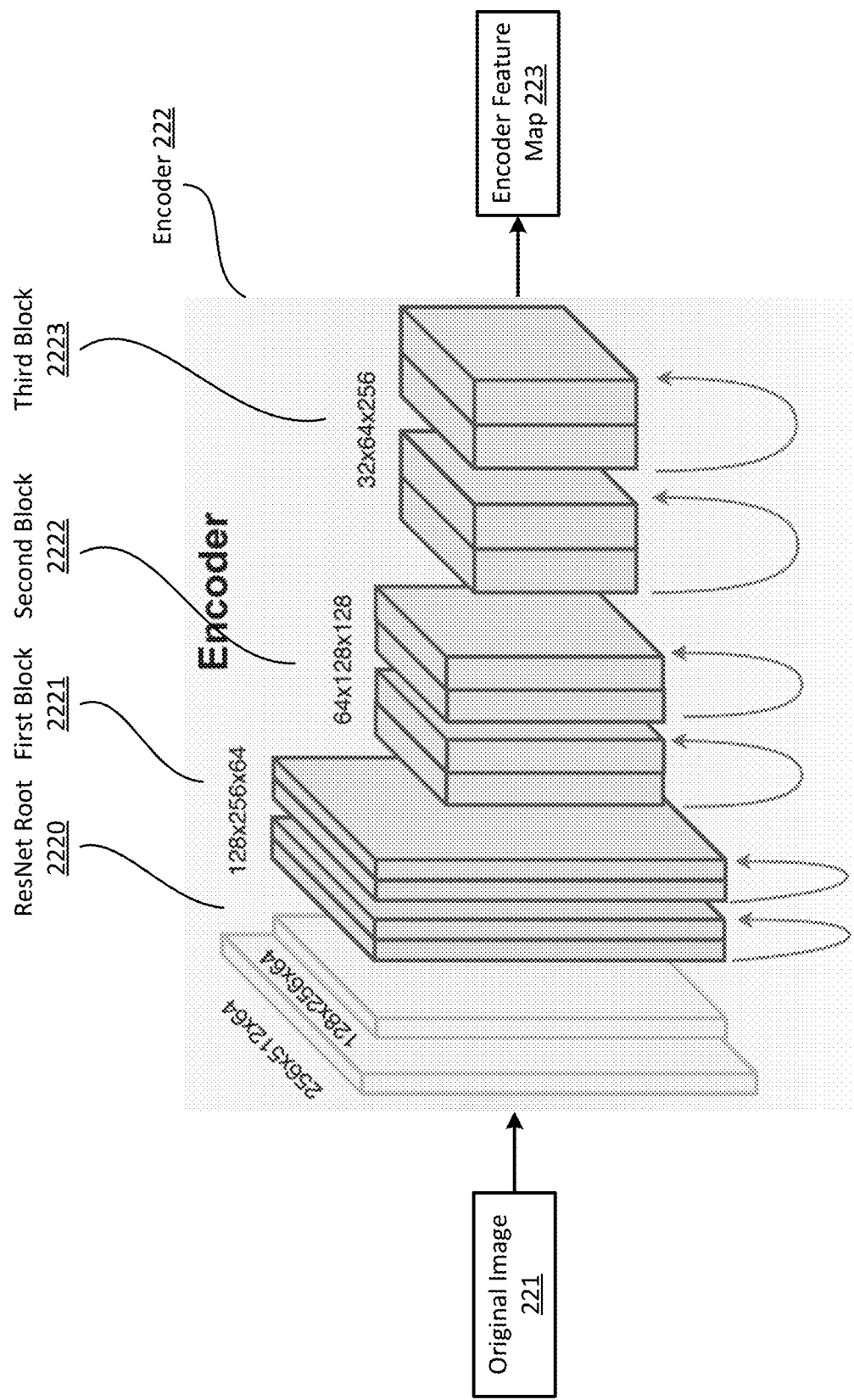
FIG. 3A schematically depicts a structure of an encoder according to certain embodiments of the present disclosure.
Figure 3B:
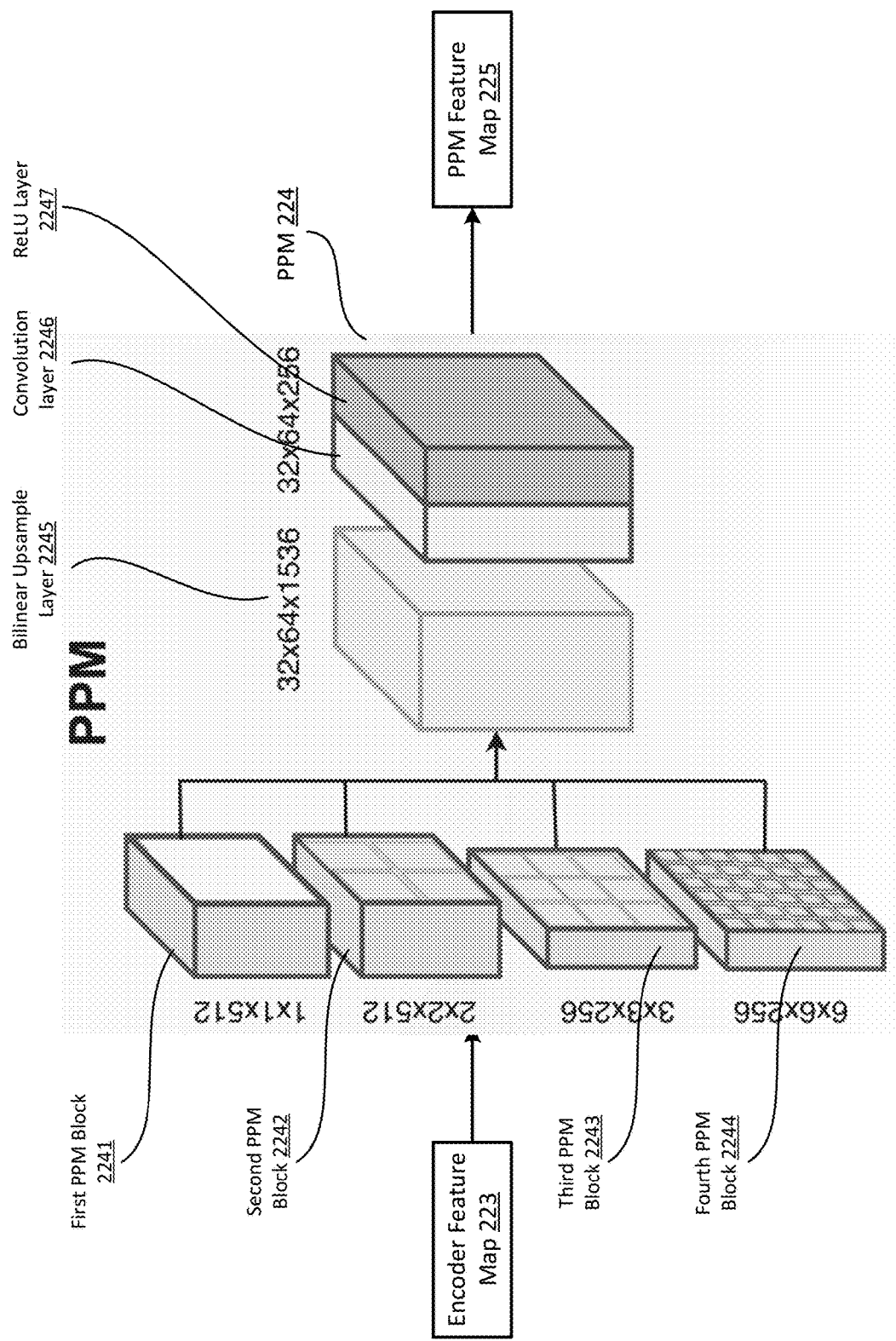
FIG. 3B schematically depicts a structure of a pyramid pooling module (PPM) according to certain embodiments of the present disclosure.
Figure 3C:
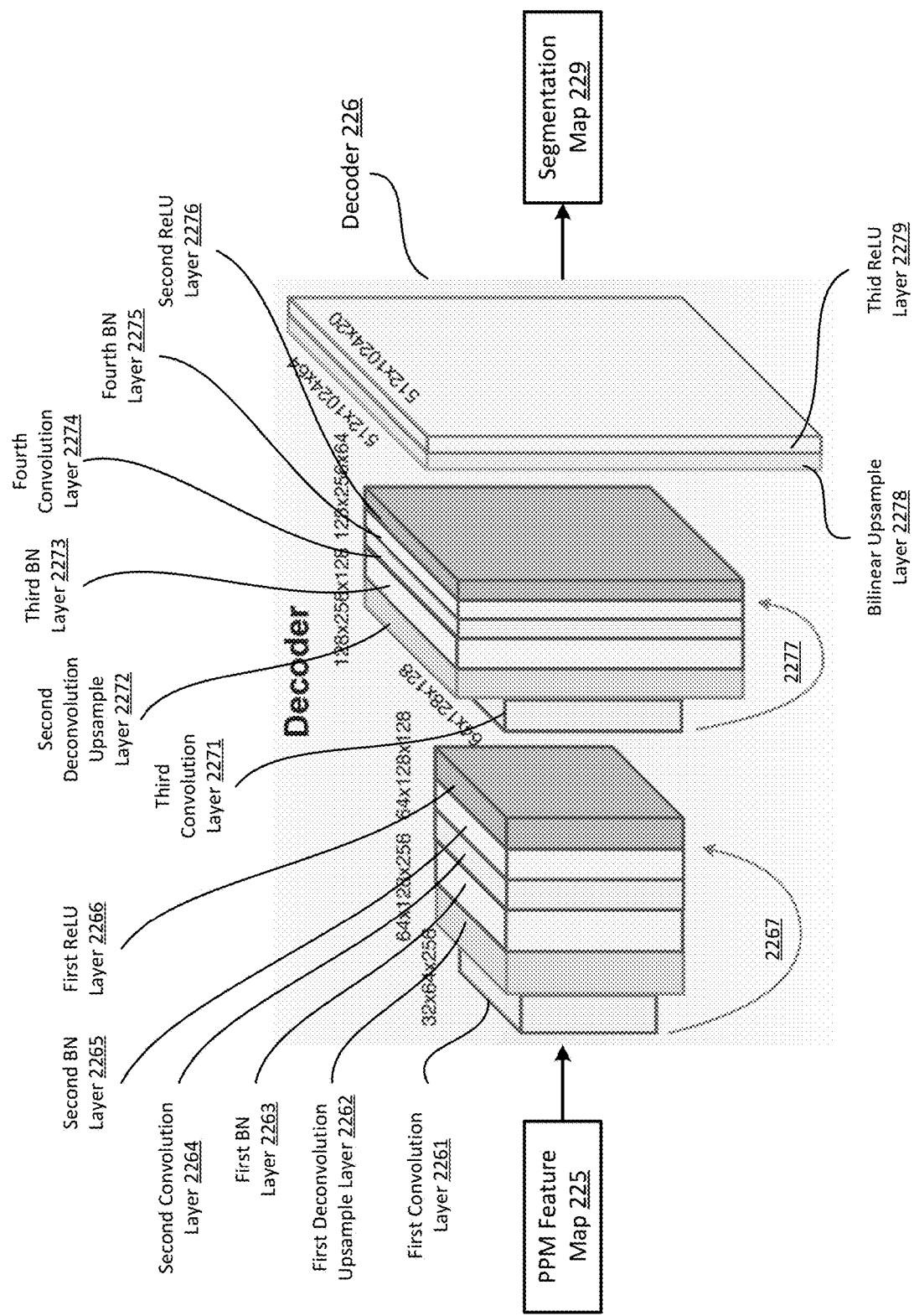
FIG. 3C schematically depicts a structure of a decoder according to certain embodiments of the present disclosure.

FIGS. 3A-3C schematically show module structures of a ThunderNet model according to certain embodiments of the present disclosure. The ThunderNet model 220 includes the encoder 222, the PPM 224 and the decoder 226. The encoder 222 is configured to receive and process an original image 221 to obtain an encoder feature map 223, and send the encoder feature map 223 to the PPM 224. The PPM 224 is configured to receive the encoder feature map 223, process the encoder feature map 223 to obtain a PPM feature map 225, and send the PPM feature map 225 to the decoder 226. The decoder 226 is configured to receive the PPM feature map 225, and process the PPM feature map 225 to obtain a segmentation map 229. The encoder 226 is further configured to send the segmentation map 229 to other related modules or applications such as the controlling module 234, or make the segmentation map 229 accessible by the other related modules or applications.

As shown in FIG. 3A, the encoder 222 includes ResNet root 2220, first block 2221, second block 2222, and third block 2223. The encoder 222 only includes the three blocks instead of the four blocks provided by a standard ResNet18. In other words, the encoder 222 is formed by truncating the fourth block of ResNet18. The ResNet root 2220 and the three blocks 2221-2223 each have dimensions of H×W×C, where H means height, W means width, and C means channel of image data.

The ResNet root 2220 is configured to receive the original image 221 from the image capturing module 220, extract basic features from the original image 221 to obtain a feature map, and input the feature map to the first block 2221. The original image 221 may have a resolution of, for example, 512×256, 1024×512, or 2048×1024. The ResNet root 2220 is part of ResNet18 backbone, which is configured to pre-treat the original image 221. The obtained feature map after the pre-treatment includes pixels, each pixel has a value or vector representing the feature of the pixel. Each vector has a length or dimensions of C. The values of C is learned during training of the ThunderNet model. As shown in FIG. 3A, the two units of the ResNet root 2220 respectively have sizes of 256×512×64 and 128×256×64. In certain embodiments, the reducing of the map from 256×512×64 to 128×256×64 is by max pooling. By max pooling, the reduced dimensions are the same as that of the first block 2221. Each units of the ResNet root 2220 includes a convolution layer, a batch normalization (BN) layer and a rectified linear unit (ReLU).

The first block 2221 is configured to receive the feature map from the ResNet root 2220, performing convolution on the feature map, and transfer the feature map after convolution to the second block 2222. The first block 2221 includes two parts (residual blocks), each part has two units, each units includes a 3×3 convolutional layer, a BN layer and a ReLU layer. In each part, as indicated by the arrow, the information from the previous unit is convolutionally added to the output of the unit immediately behind, which increased the information of the layer behind. The feature map outputted by the first block 2221 is processed by max pooling such that the H and W dimensions of the feature map outputted by the first block 2221 are the same as the H and W dimensions of the second block 2222.

The second block 2222 is configured to, upon receiving the feature map from the first block 2221, performing convolution on the feature map, and transfer the feature map after convolution to the third block 2223. The structure of the second block 2222 is similar to that of the first block 2221. But the layers of the second block 2222 has a smaller dimension of 64×128. With the lower resolution of the feature map, the second block 2222 is configured to increases the channels from 64 to 128, such that more information can be added at a lower resolution.

The third block 2223 is configured to, upon receiving the feature map from the second block 2222, performing convolution on the feature map, and transfer the feature map after convolution to the PPM 224. The structure of the third block 2223 is similar to that of the second block 2222. But the layers of the third block 2223 has a smaller dimension of 64×128. The structure of the third block 2223 is similar to that of the second block 2222. But the layers of the third block 2223 has a smaller dimension of 32×64. With the lower resolution of the feature map, the third block 2223 is configured to increases the channels from 128 to 256, such that more information can be added at a lower resolution.

The output by the third block 2223 is an encoder feature map 223, which is passed to the PPM 224.

In the encoder 222, the first block 2221 has a higher resolution than the second block 2222, the second block 2222 has a higher resolution than the third block 2223, and the channels are increased from 64, 128 to 256 for the three blocks 2221, 2222, and 2223. The first block 2221 has a high resolution, which is configured to extract more detailed feature, and a lower number of kernels or channels are used to save computing resources. The second block 2222 has a resolution lower than the first block 2221, which is configured to extract less detailed feature, and a greater number of kernels or channels are used. The third block 2223 has a lower resolution than the second block 2222, which is configured to extract less detailed feature than the second block 2222, and a greater number of kernels or channels are used.

The dimensions of the blocks 2221-2223 are presented for explaining the strategy according to certain embodiments, and not for limiting the scope of the disclosure. For example, the sizes of 128×256×64, 64×128×128, and 32×64×256 of the first, second and third blocks 2221-2223 may vary, where H and W are smaller, while C is greater from the first block 2221 to the second and third blocks 2222 and 2223. During training, the parameters of the encoder 222 are variables. After training, the parameters are fixed, such that the model can be used to generate semantic segmentation in real application.

The PPM 224 is configured to, upon receiving the encoder feature map 223 from the encoder 222, process the encoder feature map 223 to obtain PPM feature map 224. In certain embodiments, the PPM 224 has the same setting as that of PSPNet [30] but further reduce the bottleneck convolution layer (the one after bilinear upsampling) to 1×1 convolution with 256 channels (instead of 3×3 convolution with 512 channels in [30]). As shown in FIG. 3B, the PPM 224 includes four blocks 2241-2244, a bilinear upsample layer 2245, a convolution layer 2246, and an average pooling layer 2247. The four blocks are the first block 2241, the second block 2242, the third block 2243 and a fourth block 2244, which represent pyramid pooled features at different sizes. The PPM 224 is configured to extract multi-scale features from the encoder feature map 223. In certain embodiments, the feature extraction from the encoder feature map 223 to the four feature maps at difference sizes are performed using average pooling. In the embodiments shown in FIG. 3B, the dimensions of the multi-scaled first, second, third and fourth blocks are respectively 1×1×512, 2×2×512, 3×3×256, and 6×6×256. The PPM 224 is then configured to, after obtaining the feature maps at different sizes, resize and concatenate the four feature maps into the bilinear upsample layer 2245. The resize is performed on the H and W dimensions, while the C dimensions of the four feature maps (or four blocks 2242-2244) are added together to form the bilinear upsample layer 2245 (512+512+256+ 256=1536). The PPM 224 is further configured to process the bilinear upsample layer 2245 by a 1×1 convolution layer 2246, to obtain the ReLU layer 2247. The dimensions of the convolution layer 2246 and the ReLU layer 2247 are 32×64× 256. The ReLU layer 2247 is configured to provide the output, that is, the PPM feature map 225, and pass the PPM feature map to the decoder 226.

The decoder 226 is configured to, upon receiving the PPM feature map 225 from the PPM 224, decode the PPM feature map 225 to obtain the segmentation map 227. The decoder 226 is customized which consists of two consecutive deconvolution upsampling that both appends to and followed by a 1×1 convolution layer. Specifically, as shown in FIG. 3C, the decoder 226 includes sequentially: a first convolution layer 2261, a first deconvolution upsample layer 2262, a first BN layer 2263, a second convolution layer 2264, a second BN layer 2265, a first ReLU layer 2266, a third convolution layer 2271, a second deconvolution upsample layer 2272, a third BN layer 2273, a fourth convolution layer 2274, a fourth BN layer 2275, a second ReLU layer 2276, a bilinear upsample layer 2278, and a fifth convolution layer 2279. In certain embodiments, the dimensions of the layers 2261-2266, 2271-2276, 2278 and 2279 are respectively 32×64× 256, 64×128×256, 64×128×256, 64×128×128, 64×128×128, 64×128×128, 64×128×128, 128×256×128, 128×256×128, 128×256×64, 128×256×64, 128×256×64, 512×1024×64, and 512×1024×20. The first convolution layer 2261, the second convolution layer 2264, the third convolution layer 2271, and the fourth convolution layer 2274 are 1×1 convolution layers. The arrow 2267 indicates feature pyramid architecture by adding the information from the input of the first convolution layer 2261 to the first ReLU layer 2266, and the arrow 2277 indicates another feature pyramid architecture by adding the information from the third convolution layer 2271 to the second ReLU layer 2276. The H and W dimension of the second ReLU layer 2276 is increased by 4 folds to form the bilinear upsample layer 2278, and the Bilinear upsample layer 2278 having dimensions of 512× 1024×64 is timed by 1×1 in the H and W dimension, and decreased in the C dimension to form the third ReLU layer 2279 that has the dimensions of 512×1024×20. The output of the decoder 226 is the segmentation map 229, which is a feature map, and the decoder 226 is further configured to send the segmentation map 229 to the controlling module 234.

The training module 232 is configured to retrieve the training data 236 and train the ThunderNet model 220 using the training data 236. In certain embodiments, the ThunderNet model 220 may be trained in advance before being installed to the storage device 216, and there is no need to have the training module 232 and the training data 236, and parameters of the trained ThunderNet model 220 may be updated from external resources.

The training data 236 includes training images and labels of the training images. When the training module 232 is configured to train the Thunder model 220 using the training data 232, the operation of the ThunderNet model 220 is almost the same as that described above in related to the explanation of the encoder 222, the PPM 224 and the decoder 226. But when the decoder 226 is further configured to use argmax to convert the segmentation map 228 to labels, and compare the converted labels with the labels of the training images, so as to know the differences (or errors) between the converted labels and the original labels. The errors is back propagated through the decoder 226, the PPM 224 and the encoder 222 of the ThunderNet model 220, so as to optimize the parameters of the ThunderNet model 220.

The controlling module 234 is configured to, upon receiving the segmentation map 229 from the decoder 226, control the operation of the operating device 270 based on the segmentation map 229, the labels of the segmentation map 229, and operating instructions.

Figure 3D:
FIG. 3D schematically depicts an image of a scene according to certain embodiments of the present disclosure.
Figure 3E:
FIG. 3E schematically depicts segmentation result of the image in FIG. 3D generated by ThunderNet according to certain embodiments of the present disclosure.

FIG. 3D and FIG. 3E schematically show an original image and a feature map generated by the ThunderNet model 220 using the original image.

The dimensions of the ThunderNet structure as shown in FIGS. 3A-3C are for illustration only, and are not intended to limit the scope of the disclosure. A variety of H, W, C dimension sizes may be used based on the type of data to be processed, as along as the encoder decreases the H and W sizes and increases the C size, and have only three ResNet18 blocks, the PPM has different pooling sizes to extract feature at multi-scales, and the decoder increases the H and W sizes and decreases the C size. With the truncated ResNet18 backbone, our model has much fewer parameters than regular backbone like VGG16 or ResNet50 and ResNet100. What's more, by using the feature pyramid structure in the decoder, our model does not add extra parameters but gain additional information.

Figure 4:
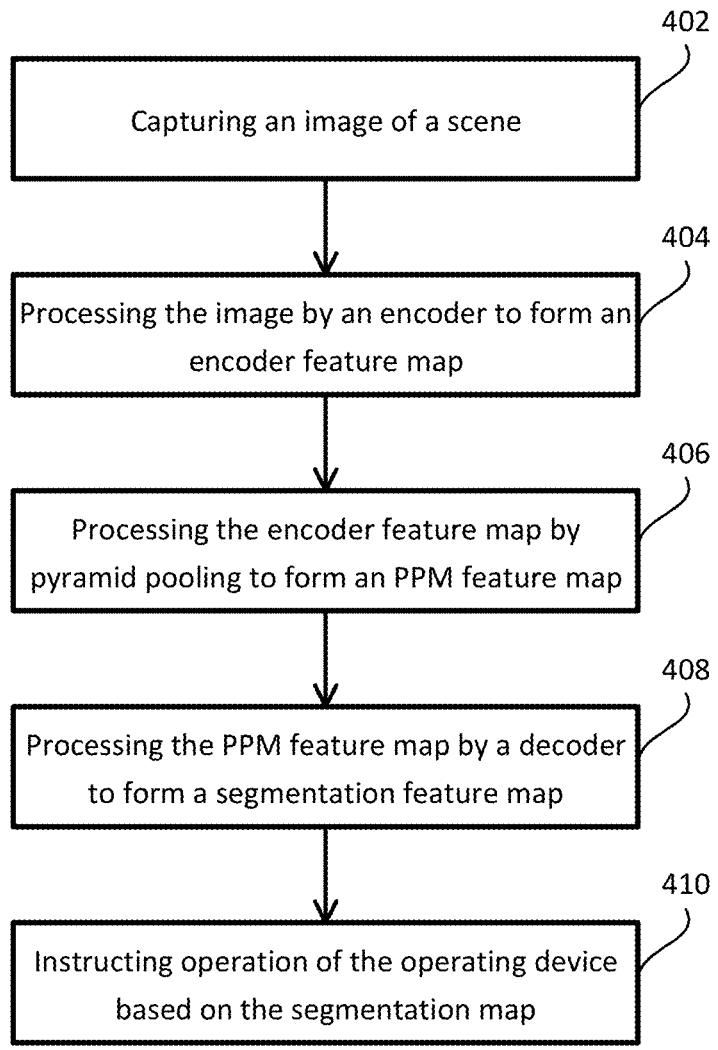
FIG. 4 schematically depicts a method of using ThunderNet to process an image according to certain embodiments of the present disclosure.

In certain aspects, the present disclosure relates to a method for real-time semantic segmentation. FIG. 4 schematically depicts a real-time semantic segmentation method according to certain embodiments of the present disclosure. In certain embodiments, the method as shown in FIG. 4 may be implemented on a system as shown in FIG. 2. It should be particularly noted that, unless otherwise stated in the present invention, the steps of the method may be arranged in a different sequential order, and are thus not limited to the sequential order as shown in FIG. 4.

As shown in FIG. 4, at procedure 402, the image capturing device 250 takes an image 221 of the scene and send the image to 221 the image capturing module 230, the image capturing module 230 receives the image 221, and sends the image 221 to the encoder 222 of the ThunderNet model 220. In certain embodiments, before sending the image 221 to the encoder 222, the image capturing module 230 may pre-process the image 221, such as reformatting or resize the image to meet the requirement of the encoder 222. In certain embodiments, the pre-processing function may also be performed by the encoder 222.

At procedure 404, upon receiving the captured image 221, the encoder 222 uses a three block structure of ResNet18 to process the image 221, obtains an encoder feature map 223 and sends the encoder feature map 223 to the PPM 224. Referring back to FIG. 3A, the dimension of the second layer of the ResNet root 2220 is the same as the dimensions of the first block 2221, and the layers in each of the blocks 2221-2223 are the same. The encoder 222 reduces H and W dimensions and increases C dimensions of the feature map during the process. Specifically, the encoder 222 has two ResNet layers 2220, the encoder 222 uses the first ResNet root layer to obtain basic features from the original image 221, where the feature map has a dimension of 256×512×64, and then the encoder 222 converts the 256×512×64 feature map to the 128×256×64 feature map using max pooling. After that, the encoder 222 uses the three blocks 2221-2223 to process the 128×256×64 feature map. Each of the three blocks has four units, each units includes a 3×3 convolution layer, a BN layer and a ReLU layer. In the four units of each block, the convolution of the first unit is added to the second unit, and the convolution of the third unit is added to the fourth unit, so as to increase information of the second and fourth units. In certain embodiments, the encoder 222 reduces the H and W dimensions from the first block 2221 to the second block 2222, and from the second block 2222 to the third block 2223, by max pooling, and increases the C dimensions from the first block 2221 to the second block 2222, and from the second block 2222 to the third block 2223. In certain embodiments, the encoder 222 reduces each of the H and W dimensions by two from the first ResNet root layer to the second ResNet root layer, while keeps the channels the same. Further, the encoder 222 reduces each of the H and W dimensions by two from the first block 2221 to the second block 2222 and from the second block 2222 to the third block 2223, and increases the C dimension by two from the first block 2221 to the second block 2222 and from the second block 2222 to the third block 2223. The output of the third block 2223 is the encoder feature map 223, and the encoder 222 sends the encoder feature map 223 to the PPM 224.

At procedure 406, upon receiving encoder feature map 223, the PPM 224 processes the encoder feature map 223 to obtain an PPM feature map 225, and sends the PPM feature map 225 to the decoder 226. Referring to FIG. 3B, the PPM 224 first parses the encoder feature map 223 to have representations of 1×1×512, 2×2×512, 3×3×256, and 6×6×256, respectively. The PPM 224 then concatenates the four representations to obtain the bilinear upsample layer 2245. The bilinear upsample layer 2245 is then convoluted with a 1×1 convolution layer 2246, and obtains the ReLU layer 2247. The output of the ReLU layer 2247 is the PPM feature map 225. The PPM 224 then sends the PPM feature map 225 to the decoder 226.

At procedure 408, upon receiving the PPM feature map 225, the decoder 226 decodes the PPM feature map 225 to obtain the segmentation map 227. Referring to FIG. 3C, the decoder 226 passes through the first 1×1 convolution layer 2261, and upscales the feature map by the first convolution layer 2262. The parsing continues with the first BN layer 2263, the second convolution layer 2264, the second BN layer 2265, and the first ReLU layer 2266. After that, the decoder 226 passes the feature map through the third convolution layer 2271, upscales the feature map to the second deconvolution upsampling layer 2272, and passes through the third BN layer 2273, the fourth convolution layer 2274 the fourth BN layer 2275, and the second ReLU layer 2276. The decoder 226 further scales up the feature map by increasing its H and W dimensions by two and keeps the C dimension the same at the bilinear upsample layer 2278, and then reduce the C dimensions at the third ReLU layer 2279. In addition, the first 1×1 convolution layer 2261 adds its information to the first ReLU layer 2266, and the third 1×1 convolution layer 2271 adds its information to the second ReLU layer 2276, so as to increase passed information. The output of the third ReLU layer 2279 (or the output of the decoder 226) is the segmentation map 229. In certain embodiments, the decoder 226 sends the segmentation map 229 to the controlling module 234.

At procedure 410, upon receiving the feature map 229, the controlling module 234 is configured to control operation of the operating device 270 based on the feature map 229.

Figure 5:
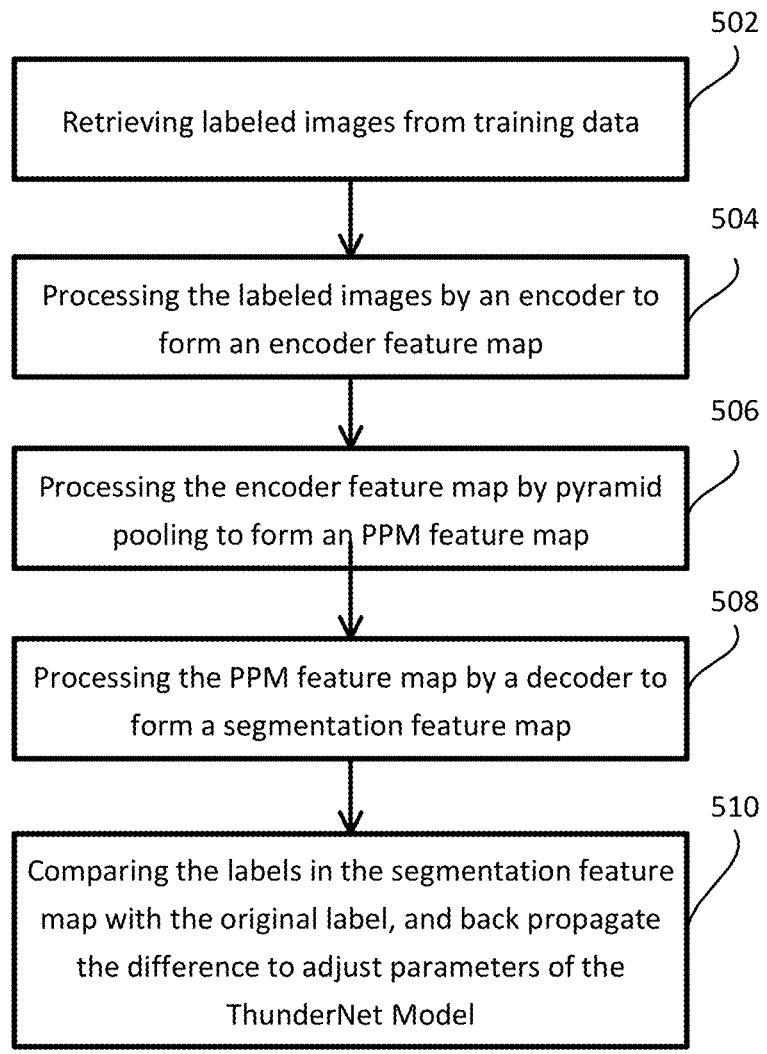
FIG. 5 schematically depicts a training method of ThunderNet according to certain embodiments of the present disclosure.

In certain aspects, the present disclosure relates to a method for training of semantic segmentation. FIG. 5 schematically depicts a training method for semantic segmentation according to certain embodiments of the present disclosure. In certain embodiments, the method as shown in FIG. 5 may be implemented on a system as shown in FIG. 2. It should be particularly noted that, unless otherwise stated in the present invention, the steps of the method may be arranged in a different sequential order, and are thus not limited to the sequential order as shown in FIG. 5.

The method shown in FIG. 5 is similar to the method shown in FIG. 4. The differences includes: the input images are labeled training images, not real-time captured images; and the labels generated by the decoder 226 are compared with the labels from the training data, and the differences are used to adjust the parameters of the ThunderNet model using back propaganda.

Specifically, at procedure 502, the training module 232 retrieves training data 236, and sends the training images to the encoder 222. At procedure 504, upon receiving the training images, the encoder 222 uses a three block structure to process each one of the training images to obtain an encoder feature map 223 and sends the encoder feature map 223 to the PPM 224. At procedure 506, upon receiving encoder feature map 223, the PPM 224 processes the encoder feature map 223 to obtain an PPM feature map 225, and sends the PPM feature map 225 to the decoder 226. At procedure 508, upon receiving the PPM feature map 225, the decoder 226 decodes the PPM feature map 225 to obtain the segmentation map 227, and to obtain labels of the training image. At procedure 510, the decoder 226 compares the generated label for the training image with the retrieved original label of the training image, and uses the differences to adjust parameters of the ThunderNet model 220 by back propaganda, from the decoder 226 back to the PPM 224, and further back to the encoder 222.

In certain aspects, the present invention relates to a non-transitory computer readable medium storing computer executable code. In certain embodiments, the computer executable code may be the software stored in the non-volatile storage device 216 as described above. The computer executable code, when being executed, may perform one of the methods described above. In certain embodiments, the non-transitory computer readable medium may include, but not limited to, the storage device 216 of the computing device 210 as described above, or any other storage media of the computing device 210.

In certain embodiments, the ThunderNet model according to the present disclosure is used to analyze Cityscapes data, and is described in the following implementation, results on Cityscapes, performance analysis, ablation studies and visualization sections.

Implementation: In one embodiment, we use PyTorch for easily prototyping our models and measure the inference speed with the exact same model implemented in Caffey. We follow a similar training policy to ERFNet [21], by using Adam optimizer [10] with learning rate of $5e^{-4}$, momentum of 0.9, and weight decay of $1e^{-4}$. For all experiments, we load a pre-trained ImageNet model of ResNet18 directly into ThunderNet, thus abandoning weights of all layers at its $4^{th}$ block. In order to overcome class imbalancing problem on Cityscapes, we use the same class weights as [21] when training alternatively ERFNet's decoder part, i.e. weights of f2.81, 6.98, 3.78, 9.94, 9.77, 9.51, 10.31, 10.02, 4.63, 9.56, 7.86, 9.51, 10.37, 6.66, 10.26, 10.28, 10.28, 10.40, 10.13, 0 g for all 19 classes. Besides, the deconvolution layers adopted in ThunderNet's decoder are implemented with kernel size of 3, stride 1 and padding 1, followed by an explicit padding of 1 around feature map outputs. Finally, we note that all our results use single-scale test, which makes our evaluation unbiased in real scenario. In addition, we report only the best result for all training models, with batch size 48 and maximum training epoch of 150 on Cityscapes.

Results on Cityscapes: We evaluate our proposed ThunderNet on Cityscapes dataset [7], which has a total of 19 classes and contains a train set of 2975 images, a validation set of 500 images, both with ground truth publicly available to download, in addition to a test set of 1525 images whose ground truth data are not available. In order to have our model evaluated on the test set, we will have to submit our results to an online testing server. Therefore, by comparing our results on both validation and test set, it allows for the models present in this embodiment to show clear signs of overfit/underfit. Note that for all the experiments present in this embodiment, we do not use any additional coarse annotations from Cityscapes for our training.

All accuracies reported in this embodiment use the common Intersection-Over-Union (IoU) metric:

$$I_oU = \frac{TP}{TP + FP + FN} \quad (1)$$

where TP, FP, FN denotes respectively the number of true positive, false positive and false negative pixel-wise predictions. The IoU metric is designed for a specific class. After averaging IOUs over all classes, we will have a fair evaluation metric namely the mean of class-wise IoU (mIoU), which indicates the overall performance of our model. Another metric that appears in this disclosure is pixel-wise accuracy (Pixel Acc), which takes additional TN (true negative) into account with all pixels:

$$\text{Pixel Acc} = \frac{TP + TN}{TP + TN + FP + FN} \quad (2)$$

We show our final results on Cityscapes test set in Table 2 (FIG. 6B). Table 2 shows final accuracy (mIoU) and speed comparisons on Cityscapes test set. As shown in Table 2, The ThunderNet has become the fastest network with comparable accuracy to a majority of the methods benchmarked. Compared to the currently fastest network in the literature ENet [19], our model has achieved much better results with more than 5.7% mIoU. When benchmarked with those methods aiming at high-quality predictions including SegNet [1], CRF-RNN [31] and DeepLabv2 [3], our method not only shows better accuracy, but also runs at significantly faster inference speed.

Performance Analysis: Same with [29], in order to have a fair evaluation of the inference speed testing under Jetson TX2 and Titan XP, we use Caffe's time measure tool Caffe time and repeat the forward-backward operations for 100 times to reduce variances during testing. It is noteworthy that as ENet published their code originally in PyTorch, we used its Caffe version publicly available at https://github-.com/TimoSaemann/ENet, which has been marked as ENet*. As illustrated in Table. 1 (FIG. 6A) and Table. 3 (FIG. 6C), our experimental results show that ThunderNet outperforms ENet at various input resolutions (except at the resolution of 1280×720, where ThunderNet is only 6.6 microsecond (ms) slower than ENet). ThunderNet runs significantly faster than ENet (about ×1.5 faster across all resolutions), particularly under Titan XP. This is due to that ThunderNet performs merely standard convolution operations that have been fully optimized with a Desktop-level GPU like Titan XP, instead of bottlenecks used in ENet that will have to be expanded rapidly during forwarding (thus benefit less regarding to those matrix optimizations). Therefore, the optimization adopted in those powerful GPUs will have to be downgraded under embedded platforms like NVIDIA Jetson TX2. With Jetson TX2, our proposed ThunderNet achieves much better results (64% vs. 58.7%), and is still ×1 to ×1.2 faster than ENet. Regarding to the real-time applications of deep learning based models for semantic segmentation, under embedded systems ThunderNet can be as fast as 20.9 fps with input size 256×512. With 640×360 (nHD) resolution, Thunder-Net runs at 12.1 fps which is sufficiently fast for most applications even in autonomous driving. Furthermore, even given the full-size (1024×2048) Cityscapes input images, by utilizing GPU like Titan XP, ThunderNet has already passed the real-time requirement with 33.3 fps.

Ablation Studies: In Table. 1 (FIG. 6A) and Table. 3 (FIG. 6C), we compare ThunderNet with those fastest networks currently available in the literature. Table 1 shows comparison of inference speed for fastest models currently available, given different input sizes of 480×320 (HVGA), 640×360 (nHD) and 1280×720 (HD) respectively. ENet indicates its original performance analysis reported in [19], while ENet* indicates is Caffe implementation that has been tested in the same environment with ThunderNet of the disclosure. Table 3 shows comparison of inference speed for ENet, ERFNet, ICNet and the ThunderNet of the disclosure, given different input sizes of 512×256, 1024×512 and 2048×1024, respectively.

Comparing to [21], we have enriched the experiments by additionally testing ENet, ICNet and our ThunderNet on both NVIDIA Jetson TX2 platform and Titan XP GPU. We conducted experiments for all above three methods in Caffe, with CUDA 8.0 and cuDNN 7.0 under Titan XP, CUDA 9.0 and cuDNN 7.0 under Jetson TX2 (using JetPack 3.2, L4T R28.2).

For backbone Selection, we started our work with ResNet18 backbone tests in Table 4 (FIG. 6D). Table 4 shows experimental result of using ReNet18 backbones with different input sizes on Cityscapes validation set. We validate the effectiveness of our backbone by simply appending bilinear upsampling layer to out Resnet18 truncated backbone (ResNet18-3b) and the original backbone (ResNet18-4b), whose output will be finally converted to logits. These results show that given input size 512×512, ResNet18-3b backbone achieves the best speed and accuracy trade-off, compared to all other options. Different from other experiments, in this experiment we measured the fps using TensorFlow and adopt a similar data augmentation method to PSPNet [30], i.e. a random mirror and a fixed-size crop after aspect ratio preserving resize with smaller side length randomly sampled between the crop size (384/512/783) and 1.5× the smaller size of Cityscapes input images (≠1500). To ensure the convergence of our tests models, we used Stochastic Gradient Descent (SGD) with learning rate 0.01 and batch size 8. All results are reported with models converged at sufficiently large training iteration ~100 k.

For PPM and Decoder Unification, following the training configurations described above, we perform the basic ablation studies by adding PPM and decoder, respectively. Table 5 (FIG. 6E) shows ablation study for respectively adding PPM and decoder on Cityscapes validation set. The result demonstrates that adding either PPM and decoder improves our ResNet18-3b backbone to a certain extent (1.1% and 2.3% respectively), while unifying the two meta-architectures significantly boosts the performance by 4:75%.

Figure 6F:
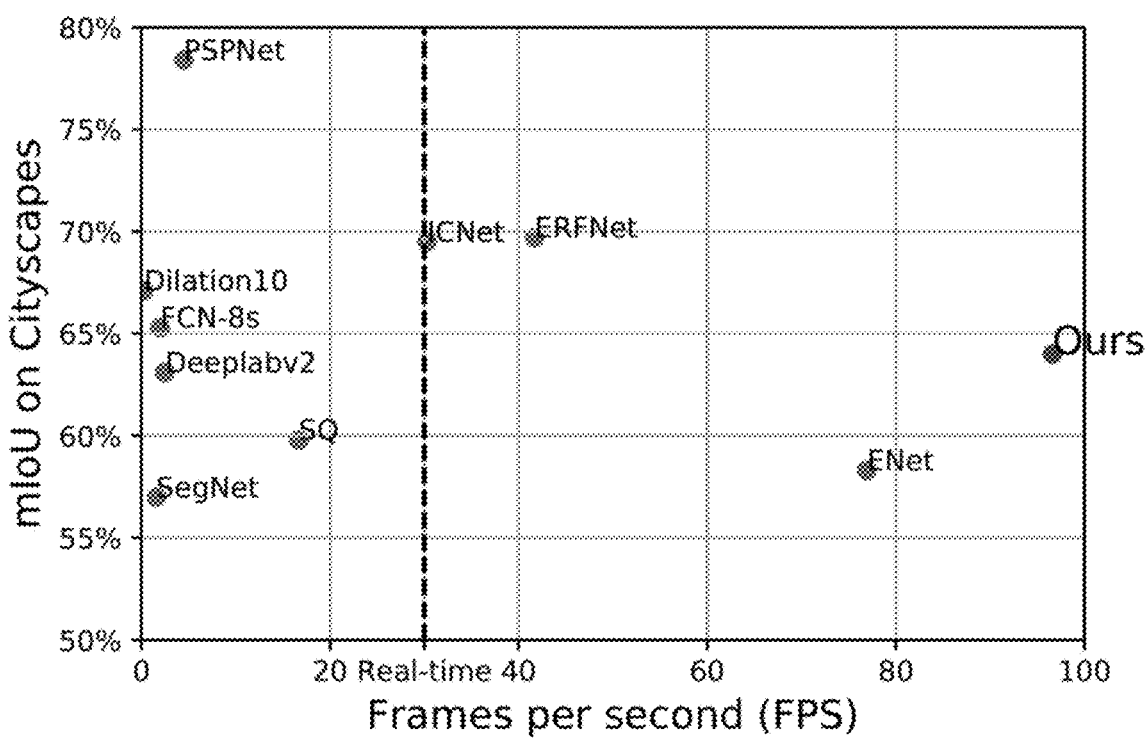
FIG. 6F schematically depicts accuracy and inference speed by different models according to certain embodiments of the present disclosure.

FIG. 6F schematically shows accuracy and speed of an ThunderNet model comparing with other models in the field according to certain embodiments of the disclosure. The other models in the field include: Seg-Net [1], FCN-8s [16], Dilation10 [28], SQ [26], Deeplabv2 [3], PSPNet [30], ENet [19], ICNet [29], ERFNet [21]. Our proposed ThunderNet is fastest and has obtained comparable accuracy to a majority of those methods.

Figure 7:
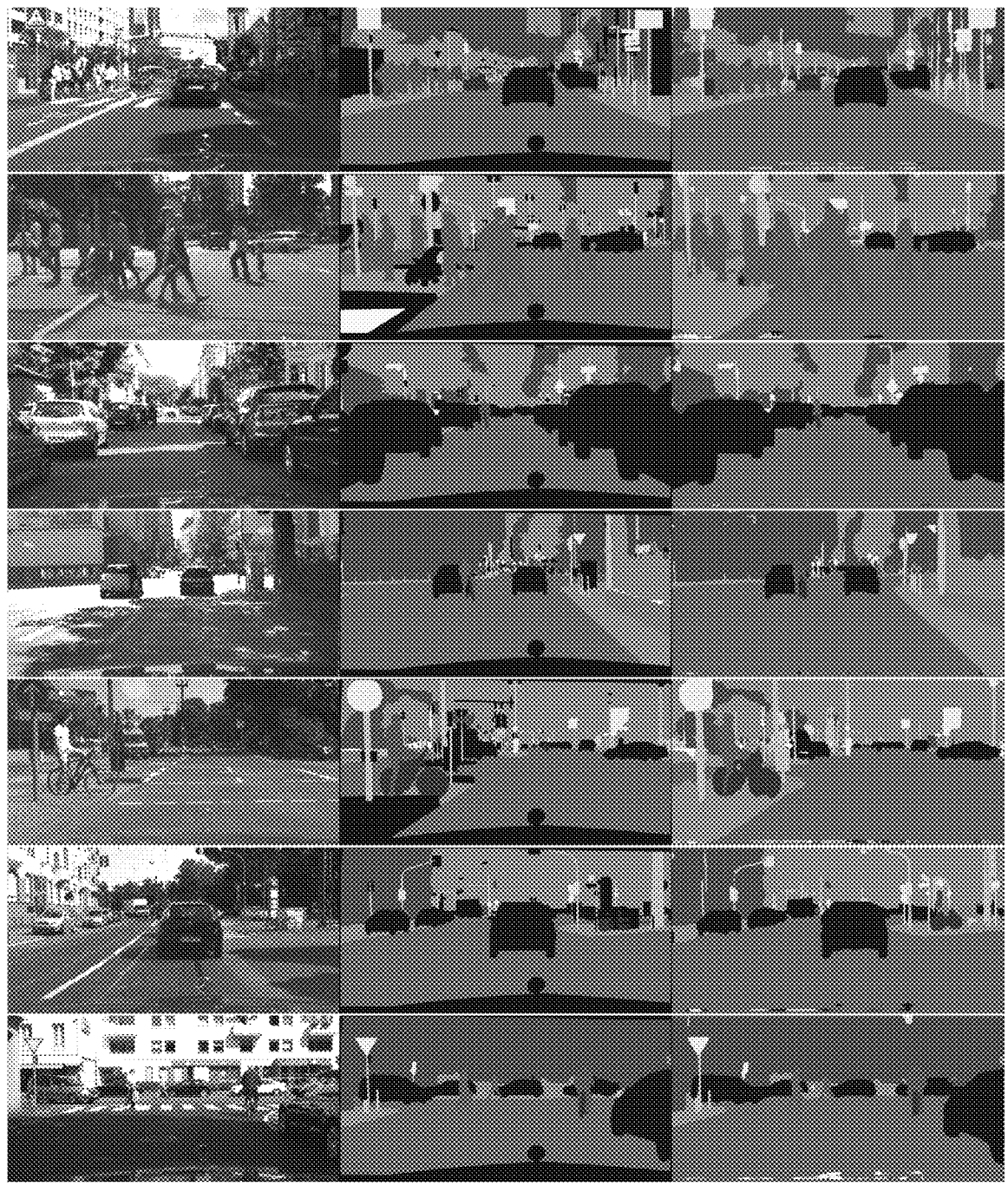
FIG. 7 schematically depicts exemplary segmentation result by ThunderNet according to certain embodiments of the present disclosure.

Visualizations: FIG. 7 shows our qualitative segmentation results using ThunderNet. We can see from those visualization results that although ThunderNet is composed of an extremely small backbone and decoder structure, it can still make good predictions for those objects far away. Despite of its lower accuracies on unbalanced classes for instance wall, pole and truck, the network makes accurate pixel-wise predictions for those commonly-seen classes including road, pedestrians and vehicles, which is sufficient for the applications of autonomous driving regarding to the trade-off between speed and accuracy it has already achieved.

In certain embodiments, the ThunderNet has the exact layered structure and dimensions as shown in FIGS. 1 and 3A-3C. In certain embodiments, the ThunderNet has the exact layered structure as shown in FIGS. 1 and 3A-3C, but the sizes of the dimensions H and W may vary or be changed proportionally (keeps dimension C the same). In certain embodiments, the ThunderNet has the exact layered structure as shown in FIGS. 1 and 3A-3C but the sizes of the dimensions H and W may vary or be changed proportionally (dimension C may vary but not proportional to the variation of H and W). In certain embodiments, the ThunderNet has the exact layered structure as shown in FIGS. 1 and 3A-3C but the sizes of the dimensions H, W and C may vary or be changed proportionally.

Certain embodiments of the present disclosure, among other things, provides a fast and efficient network for semantic segmentation called ThunderNet—a shorthand for the Turbo Unified Network. ThunderNet builds on an extremely lightweight backbone truncated from the popular ResNet18 model, and unifies both the pyramid pooling module and a customized, two-level consecutive upsampling decoder structure. Our experimental results on Cityscapes show that ThunderNet has significantly surpassed the currently fastest network in the literature ENet, regarding to both accuracy and inference speed. Even with GPU-powered embedded systems like NVIDIA Jetson TX2, ThunderNet still achieves up to 1.2× speedup. When compared to other methods proposed to achieve the better trade-off between speed and accuracy, ThunderNet still shows its advantages in speed due to its dedicated design of using merely standard convolutions. Without any other non-trivial implementation details and training policies, ThunderNet is easy to train and converges within only a few hours.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

[1] V. Badrinarayanan, A. Kendall, and R. Cipolla. Segnet: A deep convolutional encoder-decoder architecture for image segmentation. IEEE transactions on pattern analysis and machine intelligence, 39(12):2481-2495, 2017.

[2] L.-C. Chen, G. Papandreou, I. Kokkinos, K. Murphy, and A. L. Yuille. Semantic image segmentation with deep convolutional nets and fully connected crfs. In ICLR, 2015.

[3] L.-C. Chen, G. Papandreou, I. Kokkinos, K. Murphy, and A. L. Yuille. Deeplab: Semantic image segmentation with deep convolutional nets, atrous convolution, and fully connected crfs. arXiv preprint arXiv:1606.00915, 2016.

[4] L.-C. Chen, G. Papandreou, F. Schroff, and H. Adam. Rethinking atrous convolution for semantic image segmentation. arXiv preprint arXiv:1706.05587, 2017.

[5] L.-C. Chen, Y. Zhu, G. Papandreou, F. Schroff, and H. Adam. Encoder-decoder with atrous separable convolution for semantic image segmentation. arXiv preprint arXiv:1802.02611, 2018.

[6] F. Chollet. Xception: Deep learning with depthwise separable convolutions. arXiv preprint, 2016.

[7] M. Cordts, M. Omran, S. Ramos, T. Rehfeld, M. Enzweiler, R. Benenson, U. Franke, S. Roth, and B. Schiele. The cityscapes dataset for semantic urban scene understanding. In Proceedings of the IEEE conference on computer vision and pattern recognition, pages 3213-3223, 2016.

[8] K. He, X. Zhang, S. Ren, and J. Sun. Deep residual learning for image recognition. In Proceedings of the IEEE conference on computer vision and pattern recognition, pages 770-778, 2016.

[9] K.-H. Kim, S. Hong, B. Roh, Y. Cheon, and M. Park. Pvanet: deep but lightweight neural networks for real-time object detection. arXiv preprint arXiv:1608.08021, 2016.

[10] D. P. Kingma and J. Ba. Adam: A method for stochastic optimization. arXiv preprint arXiv:1412.6980, 2014.

[11] A. Krizhevsky, I. Sutskever, and G. E. Hinton. Imagenet classification with deep convolutional neural networks. In Advances in neural information processing systems, pages 1097-1105, 2012.

[12] L.-J. Li, R. Socher, and L. Fei-Fei. Towards total scene understanding: Classification, annotation and segmentation in an automatic framework. In Computer Vision and Pattern Recognition, 2009. CVPR 2009. IEEE Conference on, pages 2036-2043. IEEE, 2009.

[13] G. Lin, A. Milan, C. Shen, and I. Reid. Refinenet: Multi-path refinement networks for high-resolution semantic segmentation. In IEEE Conference on Computer Vision and Pattern Recognition (CVPR), 2017.

[14] G. Lin, C. Shen, A. Van Den Hengel, and I. Reid. Efficient piecewise training of deep structured models for semantic segmentation. In Proceedings of the IEEE Conference on Computer Vision and Pattern Recognition, pages 3194-3203, 2016.

[15] T.-Y. Lin, P. Doll'ar, R. Girshick, K. He, B. Hariharan, and S. Belongie. Feature pyramid networks for object detection. In CVPR, volume 1, page 4, 2017.

[16] J. Long, E. Shelhamer, and T. Darrell. Fully convolutional networks for semantic segmentation. In Proceedings of the IEEE conference on computer vision and pattern recognition, pages 3431-3440, 2015.

[17] A. Mallya and S. Lazebnik. Learning models for actions and person-object interactions with transfer to question answering. In European Conference on Computer Vision, pages 414-428. Springer, 2016.

[18] H. Noh, S. Hong, and B. Han. Learning deconvolution network for semantic segmentation. In Proceedings of the IEEE International Conference on Computer Vision, pages 1520-1528, 2015.

[19] A. Paszke, A. Chaurasia, S. Kim, and E. Culurciello. Enet: A deep neural network architecture for real-time semantic segmentation. arXiv preprint arXiv:1606.02147, 2016.

[20] C. Peng, X. Zhang, G. Yu, G. Luo, and J. Sun. Large kernel matters—improve semantic segmentation by global convolutional network. arXiv preprint arXiv: 1703.02719, 2017.

[21] E. Romera, J. M. Alvarez, L. M. Bergasa, and R. Arroyo. Erfnet: Efficient residual factorized convnet for real-time semantic segmentation. IEEE Transactions on Intelligent Transportation Systems, 19(1):263-272, 2018.

[22] O. Ronneberger, P. Fischer, and T. Brox. U-net: Convolutional networks for biomedical image segmentation. In International Conference on Medical image computing and computer-assisted intervention, pages 234-241. Springer, 2015.

[23] O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. International Journal of Computer Vision, 115(3):211-252, 2015.

[24] K. Simonyan and A. Zisserman. Very deep convolutional networks for large-scale image recognition. arXiv preprint arXiv:1409.1556, 2014.

[25] R. Socher, C. C. Lin, C. Manning, and A. Y. Ng. Parsing natural scenes and natural language with recursive neural networks. In Proceedings of the 28th international conference on machine learning (ICML-11), pages 129-136, 2011.

[26] M. Treml, J. Arjona-Medina, T. Unterthiner, R. Durgesh, F. Friedmann, P. Schuberth, A. Mayr, M. Heusel, M. Hofmarcher, M. Widrich, et al. Speeding up semantic segmentation for autonomous driving. In MLITS, NIPS Workshop, 2016.

[27] P. Wang, P. Chen, Y. Yuan, D. Liu, Z. Huang, X. Hou, and G. Cottrell. Understanding convolution for semantic segmentation. arXiv preprint arXiv:1702.08502, 2017.

[28] F. Yu and V. Koltun. Multi-scale context aggregation by dilated convolutions. arXiv preprint arXiv:1511.07122, 2015.

[29] H. Zhao, X. Qi, X. Shen, J. Shi, and J. Jia. Icnet for real-time semantic segmentation on high-resolution images. arXiv preprint arXiv:1704.08545, 2017.

[30] H. Zhao, J. Shi, X. Qi, X. Wang, and J. Jia. Pyramid scene parsing network. In IEEE Conf. on Computer Vision and Pattern Recognition (CVPR), pages 2881-2890, 2017.

[31] S. Zheng, S. Jayasumana, B. Romera-Paredes, V. Vineet, Z. Su, D. Du, C. Huang, and P. H. Torr. Conditional random fields as recurrent neural networks. In Proceedings of the IEEE International Conference on Computer Vision, pages 1529-1537, 2015.

What is claimed is:

1. A system for semantic segmentation, the system comprising a computing device, the computing device comprising a processor and a non-volatile memory storing computer executable code, wherein the computer executable code, when executed at the processor, is configured to:

receive an image of a scene;

process the image by an encoder to form an encoder feature map, wherein the encoder comprises a ResNet18 backbone truncated away from its $4^{th}$ block;

process the encoder feature map by a pyramid pooling module (PPM) to form an PPM feature map; and process the PPM feature map by a decoder to form a segmentation feature map, wherein the PPM comprises:

pyramid pooled features at different sizes;

a bilinear upsample layer;

a 1×1 convolution layer; and a rectified linear unit (ReLU) layer.

2. The system of claim 1, wherein the encoder consists of sequentially:

a root having two units, a first block, a second block, and a third block, wherein each of the blocks has a first, a second, a third, and a fourth repeating units, the first unit is convoluted and added to output of the second unit, the third unit is convoluted and added to output of the fourth unit, and each of the two units of the root and each of the repeating units in the first, second, and third blocks consists of a 3×3 convolution layer, a batch normalization (BN) layer, and a ReLU layer.

3. The system of claim 2, wherein height, width, and channel dimensions of the two layers of the root, the first block, the second block and the third block are respectively 256×512×64, 128×256×64, 128×256×64, 64×128×128, and 32×64×256.

4. The system of claim 1, wherein the pyramid pooled features comprises 1×1×512 feature, 2×2×512 feature, 3×3×256 feature, and 6×6×256 feature.

5. The system of claim 4, wherein the bilinear upsample layer has a dimension of 32×64×1536, and each of the 1×1 convolution layer and the ReLU layer has a dimension of 32×64×256.

6. The system of claim 1, wherein the decoder comprises sequentially:
a first level deconvolution unsample block;
a second level deconvolution upsample block; and
a bilinear upsample block.

7. The system of claim 6, wherein:
the first level deconvolution unsample block comprises a first convolution layer, a first deconvolution upsample layer, a first BN layer, a second convolution layer, a second BN layer, and a first ReLU layer;
the second level deconvolution upsample block comprises a third convolution layer, a second deconvolution upsample layer, a third BN layer, a fourth convolution layer, a fourth BN layer, and a second ReLU layer;
the bilinear upsample block comprises a bilinear upsample layer and a fifth convolution layer; and
the first convolution layer is convoluted and added to the second BN layer, and the third convolution layer is convoluted and added to the fourth BN layer.

8. The system of claim 7, wherein:
the first deconvolution layer has a dimension of 32×64×256;
the first deconvolution upsample layer and the first BN layer have dimensions of 64×128×256;
the second convolution layer, the second BN layer, the first ReLU layer, and the third convolution layer have dimensions of 64×128×128;
the second deconvolution upsample layer and the third BN layer have dimensions of 128×256×128;
the fourth convolution layer, the fourth BN layer, and the second ReLU layer have dimensions of 128×256×64;
the bilinear upsample layer has a dimension of 512×1024×64; and
the fifth convolution layer has a dimension of 512×1024×20.

9. The system of claim 1, wherein the computer executable code is further configured to control an operating device in the scene based on the segmentation map.

10. A method for semantic segmentation, comprising:
receiving, by a computing device, an image of a scene;
processing, by the computing device, the image to form an encoder feature map;
processing, by the computing device, the encoder feature map to form a pyramid pooling module (PPM) feature map; and processing, by the computing device, the PPM feature map to form a segmentation feature map, wherein the step of processing the image to form the encoder feature map is performed by an encoder, and the encoder comprises a ResNet18 backbone truncated away from its 4$^{th}$ block; and wherein the step of processing the encoder feature map to form the PPM feature map is performed by a PPM, and the PPM comprises:
pyramid pooled features at different sizes;
a bilinear upsample layer;
a 1×1 convolution layer; and
a rectified linear unit (ReLU) layer.

11. The method of claim 10, wherein the step of processing the PPM feature map to form a segmentation feature map is performed by a decoder, and the decoder comprises:
a first level deconvolution unsample block;
a second level deconvolution upsample block; and
a bilinear upsample block.

12. The method of claim 11, wherein:
the first level deconvolution unsample block comprises a first convolution layer, a first deconvolution upsample layer, a first BN layer, a second convolution layer, a second BN layer, and a first ReLU layer;
the second level deconvolution upsample block comprises a third convolution layer, a second deconvolution upsample layer, a third BN layer, a fourth convolution layer, a fourth BN layer, and a second ReLU layer;
the bilinear upsample block comprises a bilinear upsample layer and a fifth convolution layer; and
the first convolution layer is convoluted and added to the second BN layer, and the third convolution layer is convoluted and added to the fourth BN layer.

13. The method of claim 10, further comprising:
controlling an operating device in the scene based on the segmentation map.

14. A non-transitory computer readable medium storing computer executable code, wherein the computer executable code, when executed at a processor of a computing device, is configured to:
receive an image of a scene;
process the image by an encoder to form an encoder feature map, wherein the encoder comprises a ResNet18 backbone truncated away from its 4$^{th}$ block;
process the encoder feature map by a pyramid pooling module (PPM) to form an PPM feature map; and
process the PPM feature map by a decoder to form a segmentation feature map,
wherein the PPM comprises:
pyramid pooled features at different sizes;
a bilinear upsample layer;
a 1×1 convolution layer; and
a rectified linear unit (ReLU) layer.

15. The non-transitory computer readable medium of claim 14,
wherein the decoder comprises sequentially: a first level deconvolution unsample block, a second level deconvolution upsample block, and a bilinear upsample block.

16. The non-transitory computer readable medium of claim 14, wherein the computer executable code is further configured to control an operating device in the scene based on the segmentation map.

* * * * *